US007167184B2

(12) United States Patent
Graham

(10) Patent No.: US 7,167,184 B2
(45) Date of Patent: Jan. 23, 2007

(54) METHOD AND APPARATUS TO CALCULATE ANY PORTER-DUFF COMPOSITING EQUATION USING PRE-DEFINED LOGICAL OPERATIONS AND PRE-COMPUTED CONSTANTS

(75) Inventor: James A. Graham, San Francisco, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 188 days.

(21) Appl. No.: 10/402,724

(22) Filed: Mar. 28, 2003

(65) Prior Publication Data
US 2003/0193508 A1 Oct. 16, 2003

Related U.S. Application Data

(60) Provisional application No. 60/372,235, filed on Apr. 11, 2002.

(51) Int. Cl.
*G09G 5/02* (2006.01)
(52) U.S. Cl. .................. 345/592; 345/561; 345/593; 345/611; 345/620; 345/629; 345/634; 382/260
(58) Field of Classification Search ........ 345/592–593, 345/629, 545–551; 382/154
See application file for complete search history.

(56) References Cited

U.S. PATENT DOCUMENTS

2002/0015039 A1* 2/2002 Moore .................. 345/421

OTHER PUBLICATIONS

Baldwin, Richard; "Java 2D Graphics, The Composite Interface and Transparency"; Java Programming Lecture Notes #320, Apr. 24, 2000; http://www.developer.com/tech/article.php/626361.*
"Class AlphaComposite"; Java 2 Platform Std. Ed. v1.4.2; date unknown http://java.sun.com/j2se/1.4.2/docs/api/java/awt/AlphaComposite.html.*
"Multimedia Programming, Lecture 4, Introduction to Java 2D"; date unknownhttp://scms.rgu.ac.uk/staff/dc/mmp/lecture4.html.*
Zukowski, John; "Magic with Merlin: Porter-Duff Rules!"; Sep. 1, 2001; http://www-106.ibm.com/developworks/java/library/j-mer0918.*
Baldwin, R.; "Java 2D Graphics, The Composite Interface and Transparency"; Java Programming Lecture Notes #320, Apr. 24, 2000; http://www.developer.com/tech/article.php/626351.*
Thomas Porter and Tom Duff, "*Compositing Digital Images*" Computer Graphics, vol. 18, No. 3, Jul. 1984. pp. 253-259.

* cited by examiner

*Primary Examiner*—Kee M. Tung
*Assistant Examiner*—Antonio Caschera
(74) *Attorney, Agent, or Firm*—Dorsey & Whitney LLP

(57) ABSTRACT

A method of performing a blending operation between a first pixel having a first pixel alpha value and a first pixel color data value and a second pixel having a second pixel alpha value and a second pixel color data value using a pre-defined set of logical operations and an associated set of pre-computed constant that includes calculating a first pixel blending factor and a second pixel blending factor based upon a selected Porter-Duff compositing equation, the first pixel alpha value, and the second pixel alpha value, such that there are no decisions to be made in an innermost calculation loop.

9 Claims, 2 Drawing Sheets

US 7,167,184 B2

METHOD AND APPARATUS TO CALCULATE ANY PORTER-DUFF COMPOSITING EQUATION USING PRE-DEFINED LOGICAL OPERATIONS AND PRE-COMPUTED CONSTANTS

CROSS REFERENCE TO RELATED APPLICATIONS

This application claims the benefit of priority from Application Ser. No.: 60/372,235, Entitled "METHOD AND APPARATUS TO CALCULATE ANY PORTER-DUFF COMPOSITION EQUATIONS USING 3 PRE-DEFINED LOGICAL OPERATIONS AND 3 PRE-COMPUTED CONSTANTS" by inventor James A. Graham filed on Apr. 11, 2002.

BACKGROUND OF THE INVENTION

1. Field of Invention

This invention relates generally to computing systems. Specifically, provides a method and system for selectively calculating any of the 12 pairs of Porter-Duff equations using a single efficient block of code.

2. Description of Related Art

Computer generated images are typically made up of many differing components or graphical elements which are "composited" (or rendered together) to create a final image. Techniques of compositing objects, which include transparency, to create a final image are well-known in the art. In a first conventional method, which derives from the "painter's algorithm", each object is normally "rendered" to create a corresponding pixel representation. The pixel representation is normally utilized in building up a final image of the objects through combining it with the representation of other objects.

An image is separated into its constituent elements so that they can be independently rendered, thereby potentially saving large amounts of time due to the use of smaller image fragments. Each element or object has associated with it a particular matte or "Alpha Channel" information which generally includes coverage information designating the shape and transparent nature of the element. The matte or Alpha Channel information is normally stored separately for each pixel. Each pixel normally stores the color components (for example Red, Green, Blue (RGB)). Therefore, each pixel of an element can be represented by the quadruple (R,G,B,.alpha.) where .alpha. represents the transparency of an element and is known generally as the "Alpha" or opacity channel. As an example, if black is represented by the RGB color components (0,0,0), then the color black can be represented by the quadruple (0,0,0,1) and a clear or totally transparent color can be represented by the quadruple (0,0,0,0).

Thomas Porter and Tom Duff, in an article entitled "Compositing Digital Images" appearing in Computer Graphics, Vol. 18, No. 3, July 1984 at pages 253–259, which is incorporated by reference in its entirety for all purposes, set out a method for compositing elements together to form "super-elements" as well as discuss methods of combining two images wherein both images have an "alpha." channel. As described therein, there are 12 main compositing operations for combining two portions of a single image. The alpha values specify either the opacity of the pixel or how much of a particular pixel is covered by the color of that particular pixel. In this way, alpha values are useful in creating digital image mixing effects when combining images through a process often referred to as alpha compositing.

There are many well known ways in which the alpha value of a pixel can be used to control how the colors of the pixels are combined. Porter and Duff defined 12 rules for how to combine the colors of two pixels based upon their respective alpha values. In defining these rules, Porter and Duff also defined the mathematics involved in using the respective alpha values to calculate "fraction values" which are multiplied with the color values of the two pixels before adding the fractional colors together. In so doing, 24 equations are required for turning the alpha value of one pixel into a fraction for the color values of the other pixel.

In order to implement a blending operation that can calculate any of the 12 standard Porter-Duff rules, it would be necessary to code for calculating the result of each of the 24 equations and then multiply by the resulting fractions and then add the values together to get the blended result. This approach would require some way to switch in the appropriate calculation into the blending algorithm depending on which rule is to be used resulting in either repeating the entire blending function 12 times each with a different pair of equations or adding a decision tree so that one copy of the function can perform any of the rules by deciding for each pair of pixels which equation must be performed. Unfortunately, however, the former choice results in a large increase in application size due to repeating the shared code of the blending operation while the latter choice results in a large body of code with decisions in the innermost loop that slow down the per-pixel blending speed.

Therefore what is desired is a method and system for selectively calculating any of the 12 pairs of Porter-Duff equations using a single efficient block of code.

SUMMARY OF THE INVENTION

According to the present invention, a method and system for selectively calculating any of the 12 pairs of Porter-Duff equations using a single efficient block of code is disclosed.

In one embodiment, a method of performing a blending operation between a first pixel having a first pixel alpha value and a first pixel color data value and a second pixel having second pixel alpha value and a second pixel color data value using a pre-defined set of logical operations and an associated set of pre-computed constants is described. The method includes calculating a first pixel blending factor and a second pixel blending factor based upon a selected Porter-Duff compositing equation, the first pixel alpha value, and the second pixel alpha value, such that there are no decisions to be made in an innermost calculation loop.

In another embodiment of the invention, computer program product for performing a blending operation between a first pixel having a first pixel alpha value and a first pixel color data value and a second pixel having second pixel alpha value and a second pixel color data value using a pre-defined set of logical operations and an associated set of pre-computed constants is described. The computer program product includes computer code for calculating a first pixel blending factor and a second pixel blending factor based upon a selected Porter-Duff compositing equation, the first pixel alpha value, and the second pixel alpha value and computer readable medium for storing the computer code.

In yet another embodiment of the invention, a method of performing a blending operation between a first pixel having a first pixel alpha value and a first pixel color data value and a second pixel having second pixel alpha value and a second pixel color data value using a pre-defined set of logical operations and an associated set of pre-computed constants, is described. The method includes fetching the alpha value for the color data value for the first pixel and fetching the alpha value for the color data value for the second pixel. Selecting a Porter-Duff compositing equation and calculating the first pixel blending factor and the second pixel blending factor based upon the selected Porter-Duff compositing equation, the first pixel alpha value, and the second pixel alpha value. The method also includes calculating a resulting alpha value based upon the first pixel blending factor, the second pixel blending factor, the first alpha value, and the second alpha value and calculating a resulting color value based upon the first pixel blending factor, the second pixel blending factor, the first color data value, and the second color data value. The the resulting alpha value and the resulting color value are associated with at the second pixel.

BRIEF DESCRIPTION OF THE DRAWINGS

The invention will be better understood by reference to the following description taken in conjunction with the accompanying drawings.

DETAILED DESCRIPTION OF SELECTED EMBODIMENTS

Reference will now be made in detail to a preferred embodiment of the invention. An example of the preferred embodiment is illustrated in the accompanying drawings. While the invention will be described in conjunction with a preferred embodiment, it will be understood that it is not intended to limit the invention to one preferred embodiment. To the contrary, it is intended to cover alternatives, modifications, and equivalents as may be included within the spirit and scope of the invention as defined by the appended claims.

Figure 1:
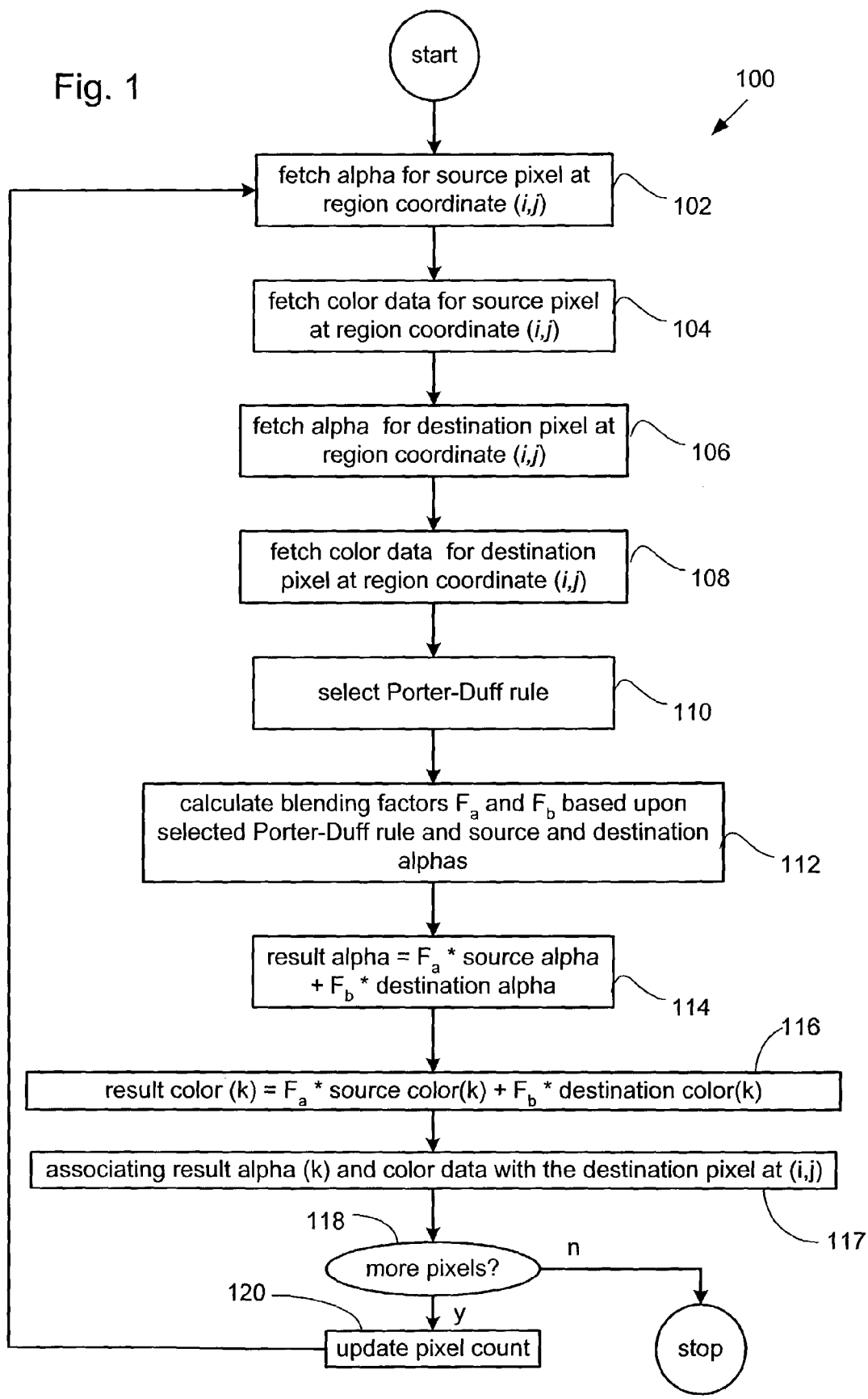
FIG. 1 shows a flowchart detailing a process for performing a blending operation between a source pixel and a destination pixel in accordance with an embodiment of the invention.

FIG. 1 shows a flowchart detailing a process 100 for performing a blending operation between a source pixel and a destination pixel in accordance with an embodiment of the invention. Initially, at 102, an alpha value for the source pixel is fetched while at 104 the color data is fetched for the source pixel. At 106 and 108, alpha data and color data, respectively, are fetched for the destination pixel. At 110, a Porter-Duff rule is selected while at 112, source and destination blending factors ($F_a$, $F_b$) are calculated based upon the selected Porter-Duff rule and the source and destination alpha values. At 114, a result alpha value is calculated based upon the source and destination blending factors while at 116, a result color is calculated based upon the source and destination color values and the source and destination blending factors. At 117, the result alpha and color data are associated with the destination pixel after which, at 118, a determination is made whether or not there are any additional pixels. If there are additional pixels, then control is passed to 102, otherwise the process 100 ends normally.

It should be noted that the described invention describes a system, method, and apparatus for performing the calculation of source and destination blending factors $F_a$ and $F_b$ described with reference to 112 above. Accordingly, the following equations are used to calculate $F_{blend}$ for each pixel in a compositing operation between two images A and B having alpha and color components of a given pair of corresponding pixels in the images A and B represented as $C_a$ and $C_b$, respectively. Accordingly, blending factors $F_a$ for image A and $F_b$ for image B represent the contributions of the pixel from the corresponding image to the pixel in the result as shown in Eq (1) below.

$$C_{result} = F_a * C_a + F_b * C_b \qquad \text{Eq(1)}$$

The blending factors $F_a$, $F_b$ are computed from the alpha value of the pixel from the other source image. Thus, $F_a$ is computed from the alpha of $C_b$ and vice versa on a per-pixel basis. A given blending factor ($F_a$, $F_b$) is computed from the other alpha components using one of the following blending factor equations depending upon the blending rule and depending on whether $F_a$ or $F_b$ is being computed.

$$F_{blend} = 0 \qquad \text{Eq (2)}$$

$$F_{blend} = \text{ONE} \qquad \text{Eq (3)}$$

$$F_{blend} = \text{alpha} \qquad \text{Eq (4)}$$

$$F_{blend} = (\text{ONE} - \text{alpha}) \qquad \text{Eq (5)}$$

It should be noted that the value "ONE" above represents the same numeric value as is used to represent "full coverage" in the alpha component. For example, for an 8 bit alpha channel ONE is equivalent to "0xff" whereas for a 16 bit alpha channel, ONE is equivalent to "0xffff". In this way, each Porter-Duff blending rule defines a pair of the blending equations Eq (2)–Eq (5) above for calculating $F_a$ and $F_b$ independently and thus control the contributions of the two source pixels to the destination pixel.

In contrast to conventional approaches that use conditional tests per pixel in the inner calculation loop, three logical and mathematical operations shown in Eq (6) can be applied to any alpha value to produce the result of one of the four blending equations Eq (2) through Eq (5), above.

$$F_{comp} = ((\text{alpha AND } F_{k1}) \text{ XOR } F_{k2}) \text{ PLUS } F_{k3} \qquad \text{Eq (6)}$$

By appropriately choosing the values $F_{k1}$, $F_{k2}$, and $F_{k3}$, the result of Eq (6) matches one of the defined $F_{blend}$ equations Eq (2) through Eq (5). More importantly, Eq (6) uses no conditional tests which can have the effect of stalling a pipelined processor and also compiles tightly into three machine instructions.

For each of the $F_{blend}$ equations Eq (2) through Eq (5), the desired values of $F_k$ are as follows:

TABLE 1

| $F_{blend}$ | $F_{k1}$ | $F_{k2}$ | $F_{k3}$ |
|---|---|---|---|
| 0 | 0 | 0 | 0 |
| ONE | 0 | 0 | ONE |
| alpha | ONE | 0 | 0 |
| ONE-alpha | ONE | −1 | ONE + 1 |

Accordingly, the following derivations for $F_{comp}$ result. It should be noted that the derivation of the Eq (11) is less obvious so it is broken down into steps and uses the well known equality for two's complement arithmetic, namely, $$((n \text{ XOR} -1) \text{ PLUS } 1) == -n \qquad \text{Eq (7)}$$

$$((\text{alpha AND } 0) \text{XOR } 0) \text{PLUS } 0 == 0 \qquad \text{Eq (8)}$$

$$((\text{alpha AND } 0) \text{XOR } 0) \text{PLUS ONE} == \text{ONE} \qquad \text{Eq (9)}$$

$$((\text{alpha AND ONE}) \text{XOR } 0) \text{PLUS } 0 = \text{alpha} \quad \text{Eq (10)}$$

$$((\text{alpha AND ONE}) XOR - 1) \text{ PLUS ONE} + 1 = \quad \text{Eq (11)}$$
$$((\text{alpha } XOR - 1) \text{ PLUS } 1) \text{ PLUS ONE} =$$
$$(-\text{alpha}) \text{ PLUS ONE} = \text{ONE} - \text{alpha}$$

For each Porter-Duff rule, an implicit index has been assigned. For a given blending operation which uses a specific rule, the index for that specific rule is used to index into a table and load values from that table in order to construct the two sets of the $F_k$ values ($F_{k1a}$, $F_{k2a}$, and $F_{k3a}$) for $F_a$ and ($F_{k1b}$, $F_{k2b}$, and $F_{k3b}$) for $F_b$. Since these $F_k$ values depend only upon the particular rule used, they can be set up at the beginning of the outer loop and are only required to perform the three operations in the $F_{comp}$ equation twice per pixel (once for $F_a$ and again for $F_b$).

Figure 2:
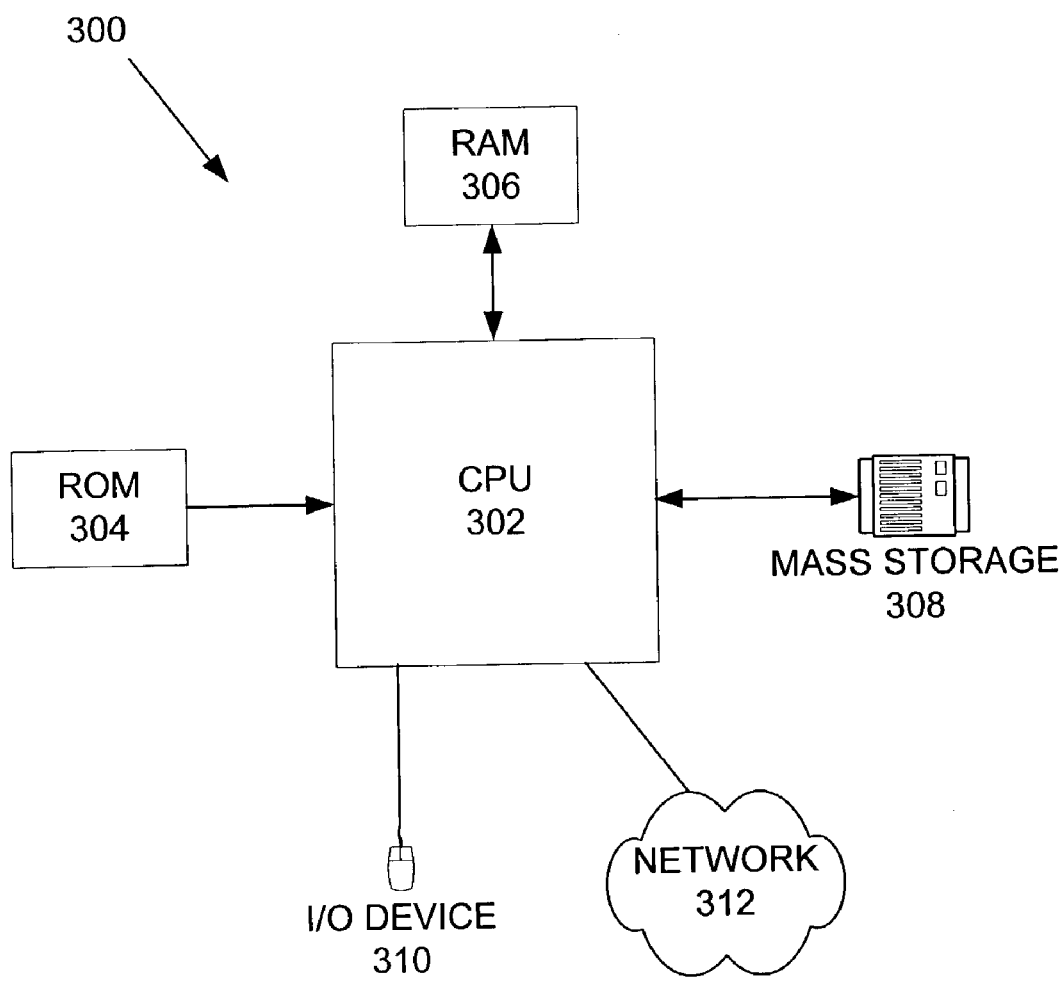
FIG. 2 illustrates a computer system employed to implement the invention.

FIG. 2 illustrates a computer system 300 employed to implement the invention. The computer system 300 or, more specifically, CPU 302, may be arranged to support a virtual machine, as will be appreciated by those skilled in the art. As is well known in the art, ROM acts to transfer data and instructions uni-directionally to the CPU 302, while RAM is used typically to transfer data and instructions in a bi-directional manner. CPU 302 may generally include any number of processors. Both primary storage devices 304, 306 may include any suitable computer-readable media. A secondary storage medium 308, which is typically a mass memory device, is also coupled bi-directionally to CPU 302 and provides additional data storage capacity. The mass memory device 308 is a computer-readable medium that may be used to store programs including computer code, data, and the like. Typically, mass memory device 308 is a storage medium such as a hard disk or a tape which is generally slower than primary storage devices 304, 306. Mass memory storage device 308 may take the form of a magnetic or paper tape reader or some other well-known device. It will be appreciated that the information retained within the mass memory device 308, may, in appropriate cases, be incorporated in standard fashion as part of RAM 306 as virtual memory. A specific primary storage device 304 such as a CD-ROM may also pass data uni-directionally to the CPU 302.

CPU 302 are also coupled to one or more input/output devices 310 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 302 optionally may be coupled to a computer or telecommunications network, e.g., an Internet network or an intranet network, using a network connection as shown generally at 312. With such a network connection, it is contemplated that the CPU 302 might receive information from the network, or might output information to the network in the course of performing the above-described method steps. Such information, which is often represented as a sequence of instructions to be executed using CPU 302, may be received from and outputted to the network, for example, in the form of a computer data signal embodied in a carrier wave. The above-described devices and materials will be familiar to those of skill in the computer hardware and software arts.

Although only a few embodiments of the present invention have been described, it should be understood that the present invention may be embodied in many other specific forms without departing from the spirit or the scope of the present invention. Therefore, the present examples are to be considered as illustrative and not restrictive, and the invention is not to be limited to the details given herein, but may be modified within the scope of the appended claims along with their full scope of equivalents.

While this invention has been described in terms of a preferred embodiment, there are alterations, permutations, and equivalents that fall within the scope of this invention. It should also be noted that there are may alternative ways of implementing both the process and apparatus of the present invention. It is therefore intended that the invention be interpreted as including all such alterations, permutations, and equivalents as fall within the true spirit and scope of the present invention.

What is claimed is:

1. A computer-implemented method of performing a blending operation between a first pixel having a first pixel alpha value and a first pixel color data value and a second pixel having a second pixel alpha value and a second pixel color data value, comprising:
    providing an equation for calculating pixel blending factors, the equation including a pre-defined set of logical operations and a set of constants, wherein when a particular set of values is selected for the constants in the equation, the equation corresponds to a specific Porter-Duff compositing equation;
    selecting a Porter-Duff composition equation by assigning a first set of values for the first pixel to the constants in the equation and assigning a second set of values for the second pixel to the constants in the equation, wherein the first and second sets of values are selected front a same finite set of constant values;
    calculating a first pixel blending factor and a second pixel blending factor based upon the selected Porter-Duff compositing equation, the first pixel alpha value, and the second pixel alpha value using the equation and without using conditional tests;
    calculating a resulting alpha value based upon the first pixel blending factor, the second pixel blending factor, the first alpha value, and the second alpha value;
    calculating a resulting color value based upon the first pixel blending factor, the second pixel blending factor, the first pixel color data value, and the second pixel color data value;
    associating the resulting alpha value and the resulting color data value with the second pixel; and
    displaying the second pixel.

2. A method as recited in claim 1, wherein the resulting alpha value is equal to the first pixel blending factor multiplied by the first pixel alpha value added to the second pixel blending factor multiplied by the second pixel alpha value.

3. A method as recited in claim 1, wherein the resulting color value is equal to the first pixel blending factor multiplied by the first pixel color data value added to the second pixel blending factor multiplied by the second pixel color data value.

4. A method as recited in claim 1, wherein the first pixel is a source pixel and the second pixel is a destination pixel.

5. A computer-readable medium encoded with computer code for performing a blending operation between a first pixel having a first pixel alpha value and a first pixel color data value and a second pixel having second pixel alpha value and a second pixel color data value, comprising:

computer code for providing an equation for calculating pixel blending factors, the equation including a pre-defined set of logical operations and a set of constants, wherein when a particular set of values is selected for the constants in the equation, the equation corresponds to a specific Porter-Duff compositing equation;

computer code for selecting a Porter-Duff composition equation by assigning a first set of values for the first pixel to the constants in the equation and assigning a second set of values for the second pixel to the constants in the equation, wherein the first and second sets of values are selected from a same finite set of constant values;

computer code for calculating a first pixel blending factor and a second pixel blending factor based upon the selected Porter-Duff compositing equation, the first pixel alpha value, and the second pixel alpha value using the equation and without using conditional tests;

computer code for calculating a resulting alpha value based upon the first pixel blending factor, the second pixel blending factor, the first alpha value, and the second alpha value;

computer code for calculating a resulting color value based upon the first pixel blending factor, the second pixel blending factor, the first pixel color data value, and the second pixel color data value;

computer code for associating the resulting alpha value and the resulting color data value with the second pixel;

computer code for displaying the second pixel; and computer readable medium for storing all the computer code.

6. A computer-readable medium encoded with computer code as recited in claim 5, wherein the computer code for resulting alpha value further comprises computer code for multiplying the first pixel blending factor by the first pixel alpha value and adding to the product of the second pixel blending factor and the second pixel alpha value.

7. A computer-readable medium encoded with computer code as recited in claim 5, wherein the resulting color value is equal to the first pixel blending factor multiplied by the first pixel color data value added to the second pixel blending factor multiplied byte second pixel color data value.

8. A computer-readable medium encoded with computer code as recited in claim 5, wherein the first pixel is a source pixel and the second pixel is a destination pixel.

9. A computer-implemented method of performing a blending operation between a first pixel having a first pixel alpha value and a first pixel color data value and a second pixel having second pixel alpha value and a second pixel color data value, comprising:

fetching the alpha value for a first pixel;

fetching a color data value for the first pixel;

fetching the alpha value for a second pixel;

fetching the color data value for the second pixel;

providing an equation for calculating pixel blending factors, the equation including a pre-defined set of logical operations and a set of constants, wherein when a particular set of values is selected for the constants in the equation, the equation corresponds to a specific Porter-Duff compositing equation;

selecting a Porter-Duff compositing equation by assigning a first set of values for the first pixel to the constants in the equation and assigning a second set of values for the second pixel to the constants in the equation, wherein the first and second sets of values are selected from a same finite set of constant values;

calculating a first pixel blending factor and a second pixel blending factor based upon the selected Porter-Duff compositing equation, the first pixel alpha value, and the second pixel alpha value using the equation and without using conditional tests;

calculating a resulting alpha value based upon the first pixel blending factor, the second pixel blending factor, the first alpha value, and the second alpha value;

calculating a resulting color value based upon the first pixel blending factor, the second pixel blending factor, the first color data value, and the second color data value;

associating the resulting alpha value and the resulting color value with the second pixel; and displaying the second pixel.

* * * * *